United States Patent [19]

Tomite et al.

[11] Patent Number: 4,833,769
[45] Date of Patent: May 30, 1989

[54] METHOD OF MANUFACTURING ARMATURE OF ELECTRIC ROTARY MACHINE

[75] Inventors: Toshio Tomite; Yasuaki Watanabe, both of Katsuta, Japan

[73] Assignee: Hitachi, Ltd., Tokyo, Japan

[21] Appl. No.: 182,433

[22] Filed: Apr. 18, 1988

[30] Foreign Application Priority Data

Apr. 20, 1987 [JP] Japan .................................. 62-98064

[51] Int. Cl.⁴ ............................................ H01R 43/06
[52] U.S. Cl. ........................................ 29/597; 29/598;
264/272.2; 310/43; 310/235; 310/236
[58] Field of Search .................... 29/597, 598; 310/42,
310/43, 235, 236; 264/272.19, 272.20

[56] References Cited

FOREIGN PATENT DOCUMENTS 56-132147 10/1981 Japan .

Primary Examiner—Carl E. Hall
Attorney, Agent, or Firm—Antonelli, Terry & Wands

[57] ABSTRACT

A method of manufacturing an armature of an electric rotary machine comprising the step of: fixedly attaching an armature core to a shaft which is a constituent component of the armature; winding armature coils in slots formed in the outer circumference of the armature core, the lower and upper lead-out portions of the armature coils being axially extended to a commutator arrangement space where a commutator is to be arranged; welding the respective end portions of each pair of the upper and lower lead-out end portions so as to join the upper and lower lead-out end portions in each pair with each other under the condition that the upper and lower lead-out end portions in each pair are arranged vertically one on the other and parallelly to each other while securing concave portions at the welding-joined portions to thereby form each of commutator segment portions; arranging the commutator segment portions in alignment at predetermined intervals circumferentially around the shaft; and molding and fixedly attaching an annular resin-molding body which will be made to be a body of commutator at the commutator arrangement space around the shaft in a manner so that the commutator segment portions are fixedly embedded in the annular resin-molding body, that the outer peripheral portions of the commutator segment portions are exposed from the outer circumference of the annular resin-molding body to enable a commutator brush to slidably contact with the outer peripheral portions of the commutator segment portions, and that the concave portions provided at the welding-joined portions of the commutator segment portions are filled with the resin of the annular resin-molding body.

3 Claims, 3 Drawing Sheets

METHOD OF MANUFACTURING ARMATURE OF ELECTRIC ROTARY MACHINE

BACKGROUND OF THE INVENTION

The present invention relates to a method of manufacturing armatures of electric rotary machines.

Referring to FIGS. 7 through 9, a conventional armature of an electric rotary machine will be described. FIG. 7 is a partly omitted front view showing a main part of a specific typical example of the conventional armature used in a starting motor, FIG. 8 is a sectional view along the line VIII—VIII in FIG. 7, and FIG. 9 is a sectional view along the line IX—IX in FIG. 7. In the drawings, the armature is constituted by a shaft 20, an armature core 21 having slots formed in its outer circumference, a commutator body (an annular resin body) 22, commutator segments 23, and pairs of armature coils 24 and 25 wound in the respective slots of the armature core 21. The armature having the foregoing constituent components is manufactured through the following process. The armature core 21 is pressed onto the shaft 20, a pair of the armature coils 24 and 25 are wound in each of the slots of the armature core 21, and the commutator body 22 prepared in advance in the separate step is pressed onto the shaft 20. The armature coil 24 inserted in each slot of the armature core 21 is bent circumferentially by a predetermined angle so as to form a lower lead-out portion 24A and the other armature coil 25 in each slot is also bent but in the reverse direction by a predetermined angle so as to form a lead-out portion 25A as shown in FIG. 7. One of the thus bent lower lead-out portions 24A of the armature coil 24 in one slot is paired with one of the upper lead-out portions 25A of the armature coil 25 in another different slot and each pair of lower and upper lead-out portions 24A and 25A are inserted at their ends into corresponding one of number of riser grooves 27 formed in the circumference of a riser portion 26, and then fastened and welded so as to be mechanically and electrically joined to corresponding one of the commutator segments 23 of the commutator body 22 in the riser groove 27. An end coil insulator 28 is interposed between each pair of the lower and upper lead-out portions 24A and 25A. The process of manufacturing such a conventional armature requires a number of manufacturing steps, troublesome work for arranging riser grooves in the commutator body and for carefully joining the armature coils to the respective commutator segments in the riser grooves, and provision of expensive commutator segments. Accordingly, the armature becomes expensive.

Recently, therefore, there has been proposed an armature manufacturing method in which one of each pair of lead-out portions of armature coils is embedded in corresponding one of grooves of an annular resin body constituting a commutator body by means of pressure fitting of the like, and the other lead-out portion of the pair is welded with the one lead-out portion so that an outer periphery of either one of the one and the other lead-out portions of the pair can slidably contact with a power feeding brush to thereby make a part of the lead-out portion serve also as a commutator segment, as disclosed in JP-A No. 56-132147, etc.

The aforementioned armature manufacturing method in which one of each pair of lead-out portions the armature coils is used also as a commutator segment, has an advantage in that expensive commutator segments which have been prepared in a separate step become unnecessary and the joining work between armature coils and commutator segments requiring troublesome and careful working can be eliminated, however, has the following problems to be solved.

In the conventional armature manufacturing method in which one of each pair of the lead-out portions of the armature coils is used also as a commutator segment, one of the coil lead-out portion in the pair is embedded in one of the corresponding one of the groove portions of the commutator and welded with the other lead-out portion in the pair in the groove. In such a coil lead-out portion fixing structure has a limit in mechanical strength against centrifugal force in high speed rotation of the armature, so that there is a possibility that the coil lead-out portions come off by the centrifugal force due to high speed rotation. Accordingly, the method could be put into practical use only for relatively low speed electric rotary machines. Particularly in the case where high speed rotation, for example, about 30,000 rpm, is required, for example, in starting operation of a starting motor provided with a reduction gear, the aforementioned armature manufacturing method has been difficult to be put into practical use because the armature manufactured by the method can not have sufficient mechanical strength against rotation.

SUMMARY OF THE INVENTION

It is therefore an object of the present invention to solve the foregoing problems in the prior art.

It is another object of the present invention to provide a method of manufacturing an armature of an electric rotary machine, in which mechanical strength sufficiently large against centrifugal force in high speed rotation can be surely obtained even in an armature of the type in which the armature coil lead-out portions are used also as the commutator segments, and in which the output efficiency of the electric rotary machine can be improved. In order to attain the aforementioned objects, according to the present invention, armatures are manufactured in the following method. In order to facilitate understanding of the subject of the present invention, description will be made will reference to the reference numerals used in the embodiment illustrated in FIGS. 4 and 5.

That is, according to the present invention, constituent components of an armature are assembled as follows. An armature core 2 is fixedly attached to a shaft 1, a pair of armature coils 4 and 5 are wound in each of the slots formed in the outer circumference of the armature core 2, each pair of lower and upper lead-out portions 4A and 5A extended from the armature coils 4 and 5 wound in different slots are axially extended to a space for provision of a commutator 3, and respective end portions 4a and 5a of the lower and upper lead-out portions 4A and 5A in the pair are welded with each other in the condition that those coil lead-out end portions 4a and 5a are arranged parallelly to each other and superposed vertically one on the other so as to make those coil lead-out end portions 4a and 5a serve as one of commutator segment portions 5. Thus, numbers of commutator segment portions S are arranged at regular circumferential intervals around the shaft 1 while securing concave portions 14 at each of the welding-joined portions 7 of the coil lead-out end portions 4a and 5a. An annular resin-molding body 3' which will be made to be a commutator 3 is formed through molding fixedly on the shaft 1 at the aforementioned commutator providing space. The aforementioned commutator segment portions S are fixedly embedded in the outer circumference of the annular resin-molding body 3' in the molding step of the annular resin-molding body 3' while the respective outer peripheral portions 50 of the commutator segment portions S are left exposed from the outer circumference of the annular resin-molding body 3' so that each of the outer peripheral portions 50 is able to slidably contact with a commutator brush 8. Further, in the aforementioned molding step, the concave portions 14 formed at the welding-joined portions 7 of the commutator segment portions S are filled with the resin of the annular resin-molding body 3' to thereby complete the electric rotary machine armature.

According to the armature manufacturing method, not only the end portions 4a and 5a of the lower and upper lead-out portions 4A and 5A of the respective armature coils 4 and 5 can be used also as the commutator segments, but the work can be simplified because the annular resin-molding body 3' is formed in the commutator providing space after positioning of the commutator segment portions S constituted by the coil lead-out end portions 4a and 5a after welded to thereby complete the armature. Thus, the method according to the present invention has features as follows:

(1) The coil lead-out end portions 4a and 5a are welded to form the commutator segment portions S;

(2) Substantially whole the commutator segment portions S are embedded in the annular resin-molding body 3' so as to be fixedly attached to the latter; and (3) The concave portions 14 are secured at the welding-joined portions 7 and the concave portions 14 are filled with the resin of the annular resin-molding body 3' so that the resin filled in the concave portions 14 function to prevent the commutator segment portions S from coming off from the resin-molding body 3'.

Thus, the commutator segment portions S can be effectively prevented from floating up and coming off from the resin-molding body 3' by means of the cooperation of the aforementioned features (1)-(3).

Furthermore, by securing the welding-joined portions 7 of the coil lead-out end portions 4a and 5a which will be made to be the components of the commutator segment portions S and by making those welding-joined portions 7 sufficiently large, it is possible to reduce the electric resistance at the joined portions between the coil lead-out end portions 4a and 5a to thereby improve the output efficiency of the electric rotary machine.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

Referring to FIGS. 1-5 now, an embodiment of the present invention will be described hereunder.

Figure 1:
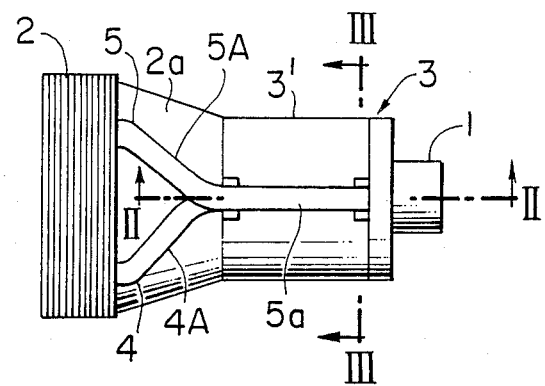
FIG. 1 is a partly omitted front view showing an armature in a manufacturing step of an embodiment of the armature manufacturing method according to the present invention.
Figure 2:
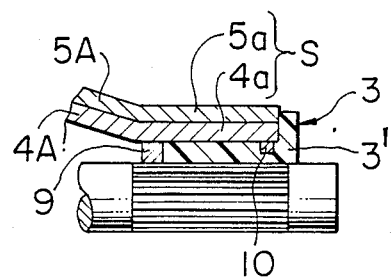
FIG. 2 is a section along the line II—II in FIG. 1.
Figure 3:
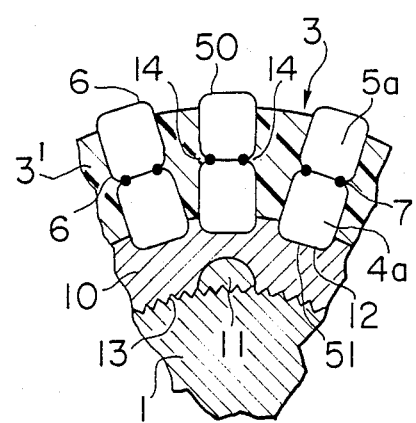
FIG. 3 is a section along the line III—III in FIG. 1.
Figure 4:
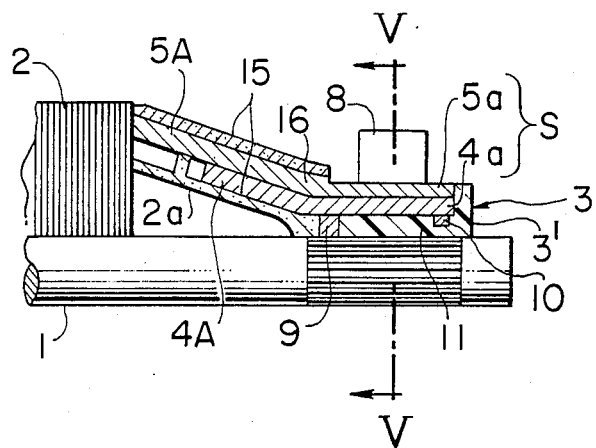
FIG. 4 is an enlarged section showing a main part of the aforementioned armature after manufactured.
Figure 5:
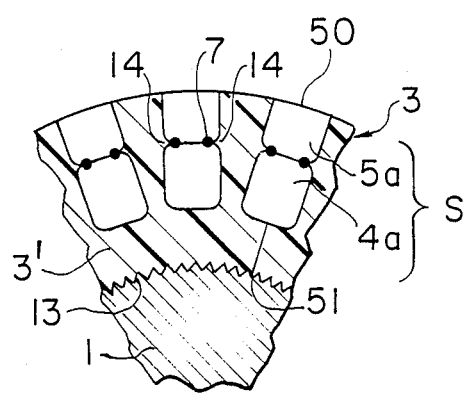
FIG. 5 is a section along the line V—V in FIG. 4.

FIG. 1 is a partly omitted front view showing an armature in a manufacturing step of the embodiment of the armature manufacturing method according to the present invention, FIG. 2 is a section along the line II—II in FIG. 1, FIG. 3 is a section along the line III—III in FIG. 1, FIG. 4 is an enlarged section showing a main part of the aforementioned armature after manufactured, and FIG. 5 is a section along the line V—V in FIG. 4.

In the drawings, an armature core 2 is mounted on an armature shaft 1, and a predetermined number of slots are formed in the armature core 2. A pair of armature coils 4 and 5 are wound in each of the slots of the armature core 2. Rectangular wire is used for the armature coils 4 and 5 in the embodiment. Each coil is chamfered at its corners so as to provide chamfered round corners 6 as shown in FIG. 3, and covered with transparent coating except welding-joined portions 7 between the armature coils 4 and 5. The respective armature coils 4 and 5 in each slot have their lower and upper lead-out portions 4A and 5A lead out of the armature core 2. One of the lower lead-out portions 4A of the armature coil in one of the slots is paired with one of the upper lead-out portions 5A of the armature coil 5 in a different slot, so that the number of the pairs of those lower and upper lead-out portions 4A and 5A is equal to the number of the slots. In FIG. 1, for the purpose of facilitating the drawing, only one pair of the coil lower and upper lead-out portions 4A and 5A are illustrated among those pairs. The lower and upper lead-out portions 4A and 5A in each pair are of the armature coils 4 and 5 which are mounted in two different slots and therefore each of the lower and upper lead-out portions 4A and 5A in the pair are bent by a predetermined angle so as to be collected on an outer peripheral surface 2a of the armature core 2. The collected pair of lower and upper lead-out portions 4A and 5A extend to reach a portion where the commutator 3 is to be provided and then further extend in the portion for the commutator 3 axially and parallelly with the shaft 1. The respective coil lead-out end portions 4a and 5a of the thus collected extended pair of lower and upper lead-out portions 4A and 5A are welded so as to be joined with each other in the condition that the coil lead-out end portions 4a and 5a are vertically superposed one on the other so that those coil lead-out end portions 4a and 5a are made to serve as a commutator segment portion S.

The commutator segment portions S except their outer peripheral portions 50, that is outer peripheral portions of the end portions 5a of the upper lead-out portions 5A arranged at the outer side in the respective slots, are embedded in an annular resin-molding body 3' which is made to be a body of the commutator 3 so that the outer peripheral portions 50 are exposed to the outside so as to be able to slidably contact with a commutator brush 8.

Annular spacers 9 and 10 are provided to hold the commutator segment portions S in the aligned state around the shaft 1. The annular spacers 9 and 10 have the same shape and have positioning grooves 12 formed at circumferentially regular intervals in their outer peripheral portions so that inner peripheral portions 51 of the commutator segment portions S, that is, the inner peripheral portions of the end portion 4a of the lower lead-out portion 4A, are filled in the positioning grooves 12. Holes 11 for pouring synthetic resin are formed at portions of the 10. Grooves 13 are formed in advance in the outer circumference of the shaft 1 at the commutator providing position by using a knurling tool so as to prevent the annular resin-molding body 3' from rotating relative to the shaft 1. The reference numeral 15 designates a resin material of epoxy resin or the like.

The method of manufacturing the thus arranged armature will be described hereunder.

First, the armature core 2 is fixed to the shaft 1, and the armature coils 4 and 5 are wound in the slots formed in the outer circumference of the armature core 2, with the lower and upper lead-out portions 4A and 5A of the armature coils 4 and 5 being extended from the armature core 2 by a substantially equal length.

Each pair of the lower and upper lead-out portions 4A and 5A are bent on the armature outer peripheral surface 2a so that the lower and upper lead-out portions 4A and 5A get together, and further bent at their end portions of a predetermined length so as to form the coil lead-out end portions 4a and 5a which are made parallel to the shaft 1. The coil lead-out end portions 4a and 5a are vertically superposed one on the other in the commutator providing space, and the contacting portions at the opposite sides of the vertically superposed coil lead-out end portions 4a and 5a are welded by a necessary length by any means of welding, for example, by laser welding, plasma welding, electron-beam welding, gas welding, or the like, to obtain the welding-joined portions 7. The thus welding-joined pairs of coil lead-out end portions 4a and 5a form the commutator segment portions S. Each corner of the coil lead-out end portions 4a and 5a has been roundly chamfered so that the concave portions 14 are secured at the welding-joined portions 7 by utilizing the shape of the chamfered round corners 6. Next, after the pairs of the coil lead-out end portions 4a and 5a, that is, the commutator segment portions S, have been positioned and aligned around the shaft 1 by using a positioning metal mold (not shown), the metal mold is removed, the annular spacers 9 and 10 are fixedly pressed-in onto the shaft 1 at predetermined positions so that the inner peripheral portions 51 of the end portion 4a of the lower lead-out portion 4A of the commutator segment portions S are fitted in the positioning grooves 12 of the annular spacers 9 and 10. Through the positioning step of the commutator segment portions S, the commutator segment portions S are circumferentially equidistantly arranged around the shaft 1 in the condition that the commutator segment portions S are separated with a gap from the outer circumference of the shaft 1. Under the condition that the arrangement space of the commutator segment portions S (that is, the commutator providing space) is surrounded by a metal mold (not shown) for the molding of the annular resin-molding body 3' while holding the outer peripheral portions 50 of the respective commutator segment portions S by the metal mold, insulating resin, for example phenol resin or the like, is poured into the metal mold, and then heated and pressured so as to fixedly form the annular resin-molding body 3' around the shaft 1 so that the annular resin-molding body 3' is made to be a body of the commutator 3. In the resin molding step, resin is poured through the holes 11 into the space defined by the annular spacers 9 and 10, the inner periphery of the metal mold, the outer circumference of the shaft 1, and the configuration surface of the commutator segment portions S except the outer peripheral portions 50 so that the space and the concave portions 14 formed at the both sides of the welding-joined portions 7 of the commutator segment portions S are filled with the resin. Thus, the commutator segment portions S except the outer peripheral portions 50 are fixedly embedded in the annular resin-molding body 3' so as to constitute the commutator 3 together with the annular resin-molding body 3'. FIG. 3 shows the state immediately after the annular resin-molding body 3' has been formed. In this state, the outer peripheral portions 50 of the end portions 5a of the upper lead-out portions 5A project outward from the outer circumference of the annular resin-molding body 3' because the outer peripheral portions 50 have been held by the metal mold. Then, the projecting portions of the outer peripheral portions 50 of the upper lead-out end portions 5a are subject to machining so that the outer peripheral portions 50 of the upper lead-out end portions 5a are made even with the outer circumference of the annular resin-molding body 3' as shown in FIG. 5 so as to enable the commutator brush 8 to slidably contact with the outer peripheral portions 50 of the upper lead-out end portions 5a. Next, as shown in FIG. 4, epoxy resin 15 is filled to the commutator outer peripheral portion 16, to the circumferential portions of the upper lead-out portion 5A except the commutator segment portions S, and to the gap between the inner circumferential portions of the lower lead-out portion 4A and the outer peripheral surface 2a of the armature core 2, and then heated so as to be fused at those portions. The epoxy resin filled to the commutator outer peripheral portion 16, that filled to the circumferential portions of the upper lead-out portions 5A, and that filled to the gap between the inner circumferential portions of the lower lead-out portion 4A and the outer peripheral surface 2a of the armature core 2 are fused so as to continue to each other to form the integrated epoxy resin 15, so that the lower and upper lead-out portions 4A and 5A are fixedly attached onto the outer peripheral surface 2a of the armature core 2.

The thus manufactured armature coils have features that the welding-joined portions 7 can be secured because the coil lead-out end portions 4a and 5a which will be made to be the commutator segment portions S are arranged parallelly to each other and welded to be joined with each other; that substantially whole the coil lead-out end portions 4a and 5a are fixedly embedded in the annular resin-molding body 3'; that the concave portions 14 are secured at the welding-joined portions 7 and filled with resin of the annular resin-molding body 3' so that the resin in the concave portions 14 functions to prevent the commutator segment portions S from coming off from the resin-molding body 3'; and that the inner and outer peripheries of the coil lower and upper lead-out portions 4A and 5A except the commutator segment portions S are fixedly attached onto the outer peripheral surface 2a of the armature core 2 by means of the epoxy resin 15 so that the mechanical strength of the armature against centrifugal force can be set to be sufficiently large. Accordingly, even when the armature rotates at a high speed, the flying out and floating up of the coils (including the commutator segment portions S) due to centrifugal force can be effectively prevented. Further, according to the embodiment, it is possible to set the welding-joined portions 7 of the coil lead-out end portions 4a and 5a constituting the components of the commutator segment portions S to be sufficiently large in length (that is, in area), so that the electric connection resistance at the welding-joined portions 7 can be made low stably, the resistance loss which occupy a large part of the rotary machine loss can be reduced, and the efficiency can be improved to thereby increase the output of the machine.

Figure 8:
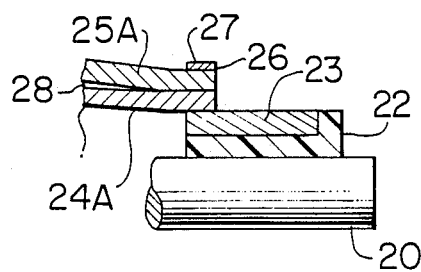
FIG. 8 is a section along the line VIII—VIII in FIG. 8.
Figure 9:
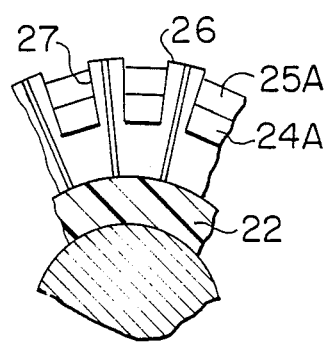
FIG. 9 is a section along the line IX—IX in FIG. 7.

Further, the embodiment has unique features in that since welding of each pair of coil lead-out portions of the commutator segment portions S is carried out at a position where the pair of coil lead-out portions do not overlap on any other pair of coil lead-out portions, the insulating coating of the other pairs of coil lead-out portions are not lowered or broken by the heat of welding, and therefore the end coil insulators (represented by the reference numeral 28 in FIG. 8) which have been used become unnecessary, so that the efficiency of the winding work can be remarkably improved.

Further, since the coil end portions are used also as the segment portions, exclusively used specific segments become unnecessary, and since the commutator 3 is constituted only by molding the coil commutator segment portions S integrally with the annular rein-molding body 3', the armature manufacturing becomes extremely easy. Furthermore, since the strong connection between the coil lead-out end portions 4a and 5a can be obtained by welding in a short time, it is possible to improve the productivity of armatures.

Figure 6A:
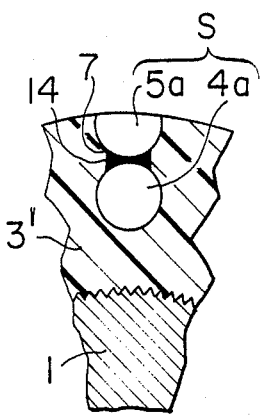
FIGS. 6A to 6C are partial sectional views showing other embodiments of the present invention.
Figure 6B:
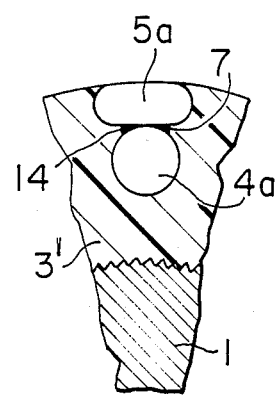
Figure 6C:
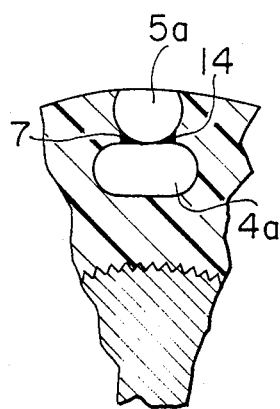
Figure 7:
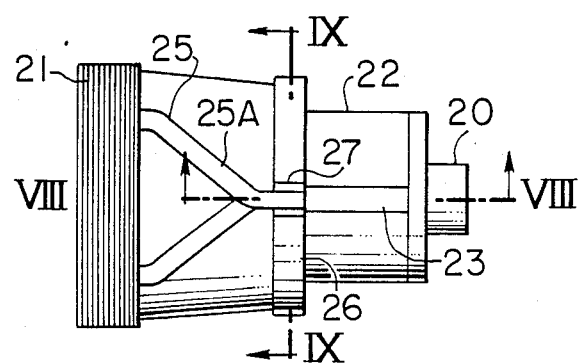
FIG. 7 is a front view showing a main part of the conventional armature.

In the embodiment, rectangular wire having roundly chamfered corners is used for the armature coils. However, the invention is not limited to this, but round wire having a circular cross section may be used for both the coils in each slot as shown in FIG. 6A, round wire and round wire made flat may be used respectively for the two coils in each slot as shown in FIGS. 6B and 6C. In FIGS. 6A-6C the parts the same as those in the foregoing embodiment are correspondingly referenced. Even in each of those modifications of FIGS. 6A-6C, it is possible to provide the concave portions at the welded portions of the coils so that the commutator segment portions can be prevented from flying off against centrifugal force by means of resin filled in the concave portions.

As described above, according to the present invention, it is possible to provide an armature of an electric rotary machine, in which mechanical strength sufficiently large against large centrifugal force in high speed rotation can be ensured even in the case of the armature of the type having the lead-out portions of the armature coils used also as the commutator segment portions, and the output of the electric rotary machine can be improved.

We claim:

1. A method of manufacturing an armature of an electric rotary machine comprising the steps of:
   fixing an armature core onto an armature shaft;
   winding armature coils in slots formed in an outer circumference of said armature core, pairs of upper and lower lead-out portions of said armature coils being extended to a commutator arrangement space there a commutator is to be arranged;
   welding said upper and lower lead-out end portions in each pair at their end portions so as to join said upper and lower lead-out end portions in each pair with each other under the condition that said upper and lower lead-out end portions in each pair are arranged vertically one on the other and parallelly to each other while forming concave portions at welding-joined portions to thereby form commutator segment portions;
   arranging said commutator segment portions in alignment at predetermined intervals circumferentially around said shaft;
   molding and fixedly attaching synthetic resin at said commutator arrangement space around said shaft so that also said concave portions at said welding-joined portions of said commutator segment portions are filled with said synthetic resin; and
   grinding outer peripheral surfaces of the molded commutator segment portions so that commutator segments are exposed on said outer peripheral surfaces of said commutator segment portions so as to enable a commutator brush to slidably contact with said commutator segments.

2. A method of manufacturing an armature of an electric rotary machine according to claim 1, further comprising the steps of: filling an insulating material to outer peripheral portions of said upper lead-out portions except said commutator segment portions and to inner peripheral portions of said lower lead-out portions, and fusing said insulating material to fixedly attach said insulating material to said outer peripheral portions of said upper lead-out portions and to said inner peripheral portions of said lower lead-out portions in a condition that said insulating material fixed to said outer peripheral portions of said upper lead-out portions is continued to said insulating material fixed to said inner peripheral portions of said lower lead-out portions, thereby fixing said upper and lower lead-out portions except said commutator segment portions onto an outer peripheral end surface of said armature core.

3. A method of manufacturing an armature of an electric rotary machine according to claim 1, further comprising the step of pressing at least one of said armature coils in each slot to make said at least one coil flat, before said upper and lower lead-out end portions of said armature coils are welded to be joined.

* * * * *